United States Patent [19]

Macaluso et al.

[11] Patent Number: 5,484,574
[45] Date of Patent: Jan. 16, 1996

[54] APPARATUS AND METHOD FOR REMOVAL OF VOLATILE ORGANIC COMPOUNDS FOR GAS STREAMS

[75] Inventors: Virgil J. Macaluso, Independence; Marvin E. Holloway, Cherryvale; John J. Albright, Independence, all of Kans.

[73] Assignee: Catalytic Industrial Group, Inc., Independence, Kans.

[21] Appl. No.: 79,209

[22] Filed: Jun. 17, 1993

Related U.S. Application Data

[63] Continuation of Ser. No. 853,803, Mar. 19, 1992, abandoned.

[51] Int. Cl.⁶ .............................. F01N 3/10; B01D 53/34
[52] U.S. Cl. ..................... 422/171; 422/173; 55/DIG. 30
[58] Field of Search ...................................... 422/171, 173, 422/177, 122, 170, 193, 198, 168, 169, 179, 202, 203, 204; 55/DIG. 30

[56] References Cited

U.S. PATENT DOCUMENTS

| 3,477,826 | 11/1969 | Moyer et al. | 422/169 X |
| 3,479,144 | 11/1969 | Brose | 422/203 |
| 3,556,734 | 1/1971 | Peterson | 55/DIG. 30 |
| 4,029,602 | 6/1977 | Risse | 252/458 |
| 4,843,815 | 7/1989 | Smojver | 422/179 X |
| 5,008,091 | 4/1991 | Bassi et al. | 422/173 X |
| 5,037,293 | 8/1991 | Kirby | 431/328 |

*Primary Examiner*—Robert J. Warden
*Assistant Examiner*—E. Leigh Dawson
*Attorney, Agent, or Firm*—Hovey, Williams, Timmons & Collins

[57] ABSTRACT

Volatile organic compounds present in a gas stream are removed by an apparatus which provides for introduction of a gas stream into the interior of a vessel having a plurality of catalytic pads. The vessel includes a heat source to bring the pads to operating temperature, the pads being arranged in a spaced-apart axially extending array defining a serpentine path through which the gas stream flows. The heat source includes a plurality of catalytic heaters which extend the length of the unit to define the walls thereof. The pad array and catalytic heater walls oxidize a portion of the volatile organic compounds present in the incoming gas stream.

5 Claims, 2 Drawing Sheets

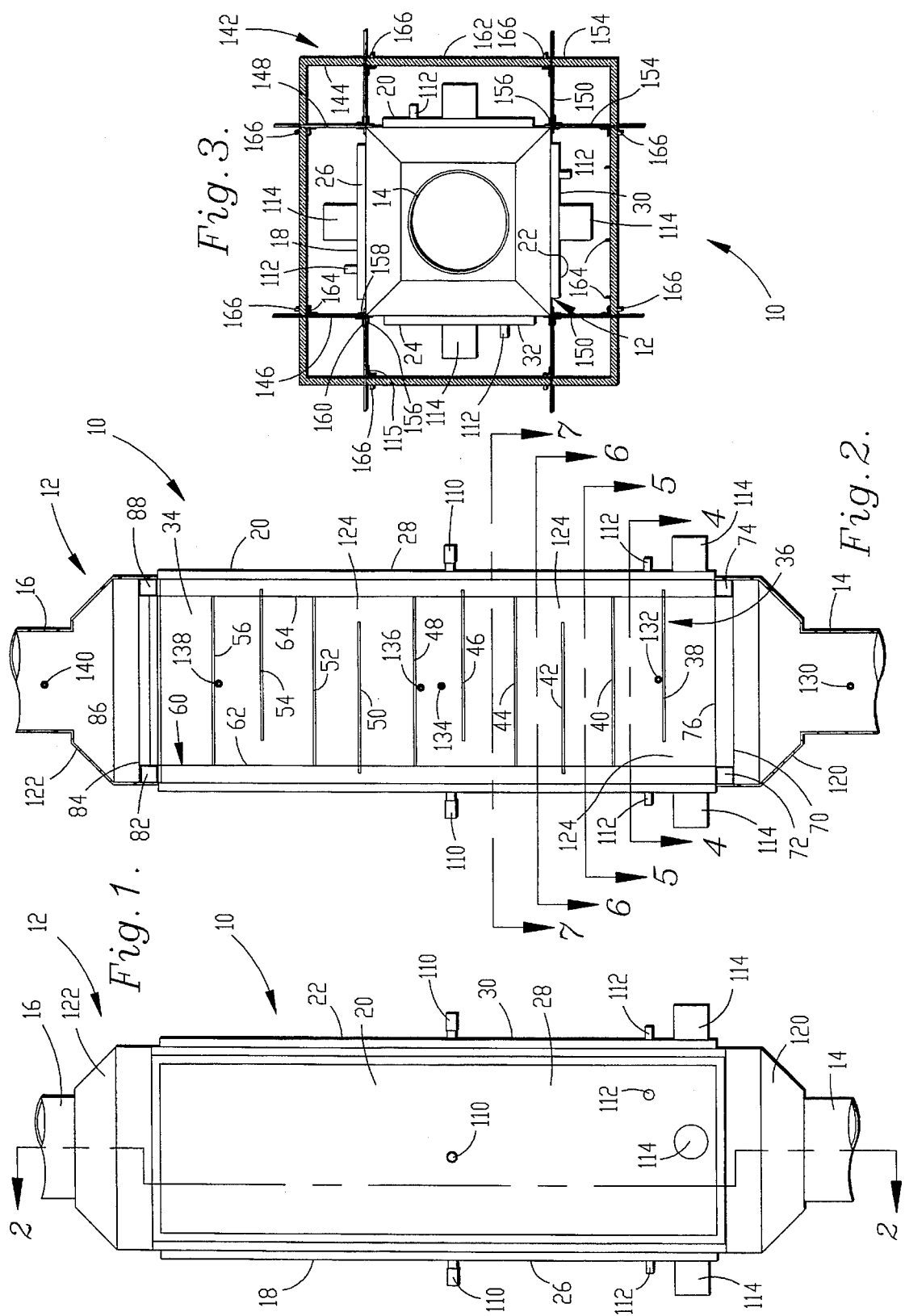

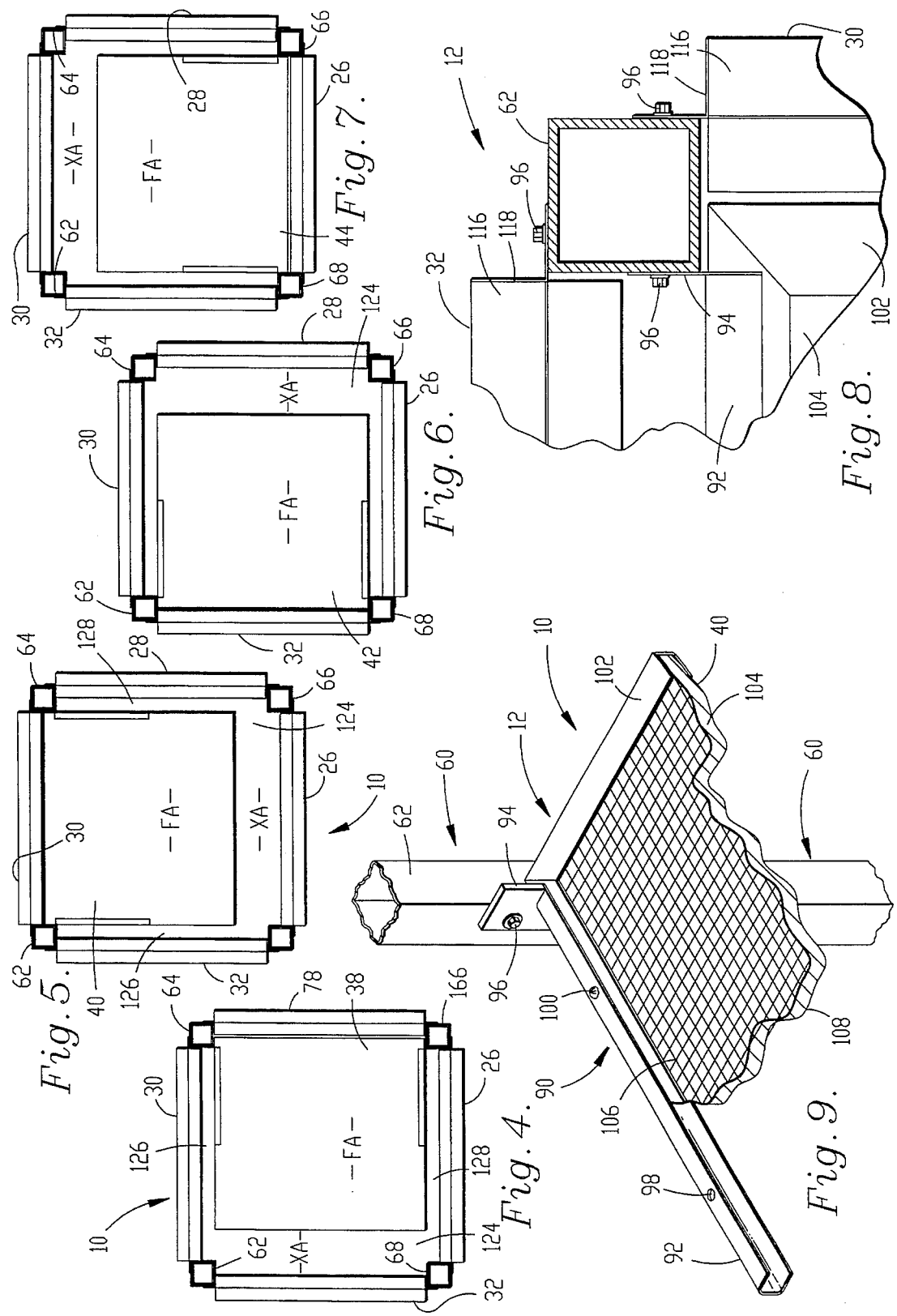

APPARATUS AND METHOD FOR REMOVAL OF VOLATILE ORGANIC COMPOUNDS FOR GAS STREAMS

This application is a continuation of application Ser. No. 07/853,803, filed on Mar. 19, 1992, now abandoned.

BACKGROUND OF THE INVENTION

1. Field of the Invention

This invention relates to a catalytic apparatus which removes volatile organic compounds from a gas stream such as air and a method of removing such compounds. The apparatus and method particularly involves heating the gas stream during its flow through the apparatus to effectively produce a catalytic reaction of the volatile organic compounds prior to exhausting the latter to the atmosphere.

2. Description of the Prior Art

Volatile organic compounds include a class of contaminants such as hydrocarbons, ammonia, $SO_x$ and the like which are regarded as harmful if released into the atmosphere. When discharged into the atmosphere without treatment, these compounds react with $NO_x$ and sunlight and produce, inter alia, ozone ($O_3$) and harmful pollutants. Ozone is regarded as a contaminant in the lower atmosphere and is thought to contribute to the development of smog. As a result, the release of volatile organic compounds is being increasingly regulated by federal and state agencies charged with environmental protection.

Volatile organic compounds (V.O.C.s) are released from a variety of different everyday products and chemicals. One such example is industrial finishes, e.g., solvent based paint. When paint is applied, or in the process of curing and drying of paint, V.O.C.s are released by evaporation. Thus, the location at which the paint is applied may be regarded as a pollution point source, and subject to governmental environmental controls. Often, the V.O.C.s can be applied, dried or cured in an oven or other substantially enclosed area where the V.O.C.s can be entrained in a gas stream for capture or conversion to acceptable gases or vapors such as $CO_2$ or $H_2O$. For example, solvent-based paints are often dried in what is effectively a convection oven where warm or hot air is blown in, heated, and then exhausted. However, such convective ovens often present a problem in that large volumes (10–50 thousand ft.³/min.) of gas (e.g. air) must be treated which have only dilute concentrations of V.O.C.s. Cleaning up the exhaust air from such ovens presents a problem because of the backpressure build-up. It is far preferable to treat a lower volume (less than ten thousand ft.³/min.) of gas with a higher concentration of V.O.C.s and thus economize on the treatment apparatus and its cost of operation.

Prior art systems have been developed for catalytic destruction of pollutants from gaseous effluent. U.S. Pat. No. 2,013,979 to Bray discloses an apparatus for starting catalytic reactions including a tube from which a controlled amount of gas is allowed to escape. The gas is ignited and burns at a predetermined distance from a bed of catalytic material. The surface layer of the catalyst is heated by the flame, and when it reaches a kindling temperature, the catalytic reaction becomes self-sustaining. U.S. Pat. No. 3,467,491 to Hardison is directed to a catalytic system for removing ammonia from vent gases. The method disclosed in this patent includes the use of a heater coil placed within the inlet section of a reactor such that the vent gases passing through the vent will be preheated to a temperature on the order of 400° F. prior to entering a shell portion of the reactor which contains a catalyst bed.

U.S. Pat. No. 4,213,947 to Fremont et al. discloses an emission control system where a burner is employed to heat a effluent gas prior to its entry into a catalyst zone. The burner serves to adjust the temperature of the effluent gas stream to the temperature at which it will be most effectively catalytically oxidized in the catalyst zone. U.S. Pat. No. 4,957,710 to Nagai discloses a catalytic exhaust gas processing device having a series of different catalyst layers. The purpose of the device is to render noxious gases into non-toxic and odorless gaseous carbon dioxide and water. In one embodiment of this device, a burner is used to heat a catalyst layer to the catalytic reaction temperature.

However, there has developed a need for a method and apparatus which effectively treats gas streams containing V.O.C.s to substantially eliminate or reduce to an acceptable level the concentration of V.O.C.s therein without subjecting the effluent stream to unacceptable backpressure. In addition, there is a need for an alternative method of heating the catalytic member which simultaneously destroys V.O.C.s within the reaction chamber. Because the destruction of V.O.C.s represents an added cost for the user, the apparatus and method to be used should not only be safe and effective, but should also be affordable to obtain and relatively inexpensive to operate.

SUMMARY OF THE INVENTION

These problems have largely been solved by the apparatus and method of the present invention. That is to say, the present invention serves to evolve the V.O.C.s present in a gas stream into relatively safe and acceptable gases discharged into the atmosphere by a catalytic system which is effective and inexpensive to operate.

The apparatus hereof includes a plurality of spaced-apart catalytic pads or beds arranged to be heated within a catalytic vessel. The catalytic pads are advantageously oriented transversely to the axis of gas flow and positioned to define a serpentine effluent gas flow path. Preferably, the pads are elevated to a temperature sufficient to react the V.O.C.s by at least one catalytic heater located in spanning relationship to a plurality of catalytic pads.

In preferred forms of the apparatus hereof, a plurality of catalytic pads are arranged in spaced relationship along an elongated catalytic reaction vessel. The pads are so arranged to define clearances between the reaction vessel and at least one edge of the pads, and with the open areas alternating so as to present a spiral unobstructed flowpath for the effluent gas axially along the vessel. Thus, while some of the effluent gas to flow will pass around a particular catalytic pad, the serpentine path through the vessel will promote turbulence and thus contact by the effluent gas with at least one of the pads so as to promote effective reaction of the V.O.C.s within the effluent gas stream.

The preferred apparatus hereof employs a vessel wherein the sidewalls thereof are largely constructed of catalytic heater panels. The use of catalytic heaters allows infrared radiation to be directed toward the catalytic pads and thereby raise the pads to an effective temperature. Moreover, the pads are arrayed along the full length of the vessel and thus it is believed will destroy a fraction (about 20% to 50%) of the V.O.C.s themselves. Together, the catalytic pads positioned within the vessel and the catalytic heaters deployed along the sides, effectively react with a high percentage of V.O.C.s without significant backpressure, particularly when employed with a relatively low flow rate/high V.O.C. concentration level effluent streams.

The invention hereof also includes a method for destroying V.O.C.s within a gaseous effluent stream. The method includes introducing a gaseous stream including a portion of V.O.C.s into a reactor vessel, heating a plurality of catalytic members within the reactor vessel, and directing the gaseous stream through the reactor vessel in a serpentine path to react a substantial quantity of the V.O.C.s within the vessel with at least one of the pads. The method may also include reacting a second portion of the V.O.C.s within the gaseous stream with at least one catalytic heater arrayed within the vessel.

BRIEF DESCRIPTION OF THE DRAWINGS

FIG. 1 is a right side elevational view of the apparatus for removing volatile compounds hereof with the insulative cover removed revealing the reaction vessel therein and showing a fragmentary portion of the gas stream intake and exhaust pipes;

FIG. 2 is a vertical cross-sectional view taken along line 2—2 of FIG. 1 showing the arrangement and spacing of the catalyst pads and thermocouple placement within the reactor vessel;

FIG. 3 is a top plan view of the apparatus hereof showing the insulative cover positioned in surrounding relationship to the reactor vessel containing the catalyst pads;

FIG. 4 is a horizontal cross-section of the reactor vessel oven of the present invention taken along line 4—4 of FIG. 2;

FIG. 5 is a horizontal cross-section of the reactor vessel of the present invention taken along line 5—5 of FIG. 2;

FIG. 6 is a horizontal cross-section of the reactor vessel of the present invention taken along line 6—6 of FIG. 2;

FIG. 7 is a horizontal cross-section of the reactor vessel of the present invention taken along line 7—7 of FIG. 2;

FIG. 8 is an enlarged, fragmentary horizontal cross-sectional view through a corner of the reactor vessel hereof showing in section an upright frame member which is connected to a pair of catalytic heater panels and a channel mounting a catalytic pad; and FIG. 9 is a fragmentary perspective view showing one of the catalytic pads mounted to an upright frame member within the apparatus hereof.

DESCRIPTION OF THE PREFERRED EMBODIMENT

The present invention is useful in connection with the catalytic destruction of effluent V.O.C.s from a variety of sources. The preferred embodiment, as discussed hereinafter, is configured for use with infrared drying/curing ovens for, e.g. curing solvent-based paints, curing rubber, drying textiles, or drying wood finishes, and which operate at relatively low effluent gas stream volumes (less than about 10,000 ft.³/min.) having a relatively high concentration of V.O.C.s as compared to comparable convection drying ovens operating at 10,000 to 50,000 ft.³/min. However, other applications are well within the scope of the following disclosure.

Referring now to the drawing, an apparatus 10 for removing volatile organic compounds from a gas stream is shown in FIG. 1 and broadly includes an elongated vessel 12 presenting an inlet 14 and an outlet 16. The four sidewalls 18, 20, 22 and 24 of the vessel 12 are largely defined by catalytic heating units 26, 28, 30 and 32. As shown in FIG. 2, the vessel 12 presents an interior 34, and within the interior is an array 36 composed of axially spaced catalytic pads 38, 40, 42, 44, 46, 48, 50, 52, 54, and 56.

In greater detail, vessel 12 is elongated with inlet 14 and outlet 16 substantially axially aligned. The vessel 12 is preferably formed of steel. The vessel 12 is constructed about a steel frame 60 including tubes 62, 64, 66 and 68, a lower box section 70 including end tubes 72, 74, and 76, and an upper box section 82 including end tubes 84, 86 and 88. Thus, frame 60 presents a substantially rectangular configuration.

Frame 60 includes mounting means 90 for mounting the catalytic pads in transverse orientation to the axis extending between the inlet 14 and the outlet 16. Mounting means 90 includes a steel channel 92 presenting a tab 94 which is positioned against an upright tube and receives a screw 96 therethrough. Channel 92 also presents a series of openings 98 for receiving a pad-securing screw 100 therein.

Each of catalytic pads 38, 40, 42, 44, 46, 48, 50, 52, 54, and 56 includes a track 102 extending around the perimeter containing a catalytic material 104 sandwiched between a pair of stainless steel screens 106 and 108. The track 102 includes a plurality of holes for receiving screws 100 therein thus securing the respective pad to the channel 92. The track is preferably formed of stainless steel. The screens 106 and 108 are of a fine mesh sufficient to retain the catalytic material 104 therein. Catalytic material typically useful in connection with the present invention includes transition metals such as iron, nickel, cobalt, rhenium, osmium, iridium, ruthenium, rhodium, palladium and platinum. More particularly, the catalytic material may be pellets, available as Poison Resistant Oxidation Technology under product code 5999 IND, 5989 IND, PZ-1157, PZ-1226, and PZ-1227 from Allied Corporation Chemical Sector of Morristown, N.J. as described in the Product Safety Data Sheet filed concurrently herewith and incorporated by reference. Alternatively, the catalytic material 104 may be alumina silica or alumina fiber impregnated with a transition metal catalyst as more particularly described in the paper, Saffil Inorganic Fibers Technical Service Report of January, 1975 by ICI United States, Inc. of Wilmington, Del., a copy of which is filed concurrently herewith and incorporated by reference. Whether the beads or fiber catalytic material are used, the catalytic pads are pervious to gas and thus a gas stream having V.O.C.s is able to pass through the screens and into the catalytic material 104 for causing a reaction to evolve the V.O.C. into a harmless by-product.

Catalytic heating units 26, 28, 30 and 32 are themselves conventional. These units are of elongated configuration and substantially span the array 36 of catalytic pads. Each of the catalytic heating units has a fuel supply inlet (e.g., natural or other gas inlet 110), an electric preheating element connected with thermocouple 112, and electrical power supply box 114. Each unit also includes a gas tight pan 116 containing, inter alia, a bed of transition metal catalyst impregnated in an alumina or alumina-silica fiber. Units of this character are described in a brochure entitled Flameless Catalytic Gas Fired Infra-Red Heaters Technical Bulletin by Catalytic Industrial Systems, Inc., the assignee of the present invention, a copy of which is filed herewith and incorporated by reference.

As may be seen in FIGS. 4 through 8, the catalytic heating units are welded to angles 118 which are connected to the tubes 62, 64, 66 and 68 by screws 96. A high-temperature caulking is applied between the frame and the catalytic heating units to seal the interior 34 of the vessel 12. Front cap 120 and rear cap 122 are affixed adjacent the inlet 14 and outlet 16 respectively to enclose the vessel 12 except the openings presented by the inlet and the outlet.

Each of the catalytic pads are relatively thin between screens 106 and 108 and are oriented transversely across the axis between the inlet and the outlet. The catalytic pads are present a frontal area FA which is less than the cross-sectional area XA across the interior 34 of the vessel 12. The channels 92 serve to mount the pads in a sequential array which presents a serpentine gas flow path through the clearance 124 defined by the catalytic pads and the sidewalls of the vessel. It may be seen from FIGS. 4 through 7 that each pad is slightly smaller in one dimension presenting a pair of gaps 126 and 128 adjacent the clearance 124. Thus, the pads sequentially obstruct the gas flow requiring the gas to flow along and thus defining a serpentine, spiral flow path.

Turning to FIG. 2, thermocouples 130, 132, 134, 136, 138 and 140 are positioned within the interior of vessel 12 and held in place by an clamp. Thermocouples 130, 134 and 140 are suspended in the interior 34 on chromel-p wire, while thermocouples 132, 136 and 138 are positioned in the center of the respective catalytic pad beneath the inlet-facing screen. Wiring extends from the thermocouples to a monitor or control unit which monitors the operating temperature of the apparatus by the temperature signals received from the thermocouples. The thermocouple wire is protected by fiberglass tape at all contact points.

In a typical installation, the vessel 12 is surrounded by an insulating cover 142 as shown in FIG. 3. The cover 142 surrounds the sidewalls of the vessel 12 and includes a metal box 144 of aluminized steel supported from the frame of the vessel 12 by corner brackets 146, 148, 150 and 152. Additional corner brackets may be axially spaced along the tubes 62, 64, 66 and 68. End covers presenting openings therein may be provided for the inlet and outlet respectively. Each corner bracket includes a pair of plates 154 disposed at approximately 90° angles from the corners of the vessel 12 and which are secured by flanges 156, 158 and 160 which are welded thereto. A blanket 162 of insulating material such as ceramic fiber is associated with box 144 to reduce heat transmission therethrough. The insulating blanket 162 is held in position by welded nails 164 which pierce the box 144 and extend into the blanket 162. Flanges 165 are welded to the plates 154 and in turn secured to the box 144 by mounting pins 166.

In operation, the apparatus 10 hereof is positioned downstream of an effluent gas conduit which conveys gas containing a quantity of V.O.C.s to the inlet 14. The apparatus 10 hereof is shown and described in an upright orientation but it is to be understood that the use of the apparatus 10 is not so limited and in fact it may be positioned in a variety of orientations. In turn, the outlet 16 is coupled to an exhaust duct which preferably includes an exhaust fan, not shown, for generating a positive flow of air through the apparatus 10. Flow rates in connection with the present apparatus are in the range of 10,000 ft.$^3$/min. or less for a typical industrial finish drying and curing oven operating with infrared heating, although larger or smaller units are well within the scope of the present invention.

Gas inlets 110 are connected to a source of natural gas or other fuel in order to fuel the catalytic heaters 26, 28, 30, and 32. The piping used to provide natural gas to the gas inlets 110 preferably includes a regulator which in turn is operatively coupled to a control unit. The thermocouples 30, 32, 34, 36, 38 and 40 are in turn coupled to the control unit by electrical wiring, so that the amount of natural gas fed to the catalytic heaters by the piping is in large measure determined by the operating temperature of the apparatus 10 as sensed by the thermocouples.

On start-up of the apparatus 10, the electrical resistance elements within the catalytic heaters are energized by an electrical source coupled to each of the electrical boxes 114 and fuel is then fed to the gas inlets 110. The natural gas or other fuel is then oxidized by the catalytic bed within each of the heaters and the catalytic pads 38, 40, 42, 44, 46, 48, 50, 52, 54 and 56 are thus brought up to operating temperature by the infrared radiation emitted by the heaters. Typically, the catalytic pads are heated to in excess of about 250° F.

Once the catalytic pads have reached an operating temperature, an effluent gas stream is introduced into the inlet 14. The array 36 of catalytic pads presents a serpentine spiral flow path through which the effluent gas passes in a downstream direction between inlet 14 and outlet 16.

As the effluent gas stream contacts the catalytic pads, the V.O.C.s in the gas stream are destroyed in that they typically evolve into harmless gases such as $CO_2$ and $H_2O$. It may be appreciated that some of the more complex V.O.C.s will evolve into other compounds and that, depending on the oxygen content of the effluent gas stream, incomplete evolution may sometimes take place. However, the effluent gas streams are largely rendered free of contaminant by the action of the catalytic pads and the catalytic heaters. With respect to the latter, the catalytic heaters advantageously destroy about a significant fraction of the V.O.C.s in the gas stream, and the catalytic pads and heaters are designed to yield a total efficiency of about 90% to 98% reduction in V.O.C.s.

The gas streams enter the inlet 14 of the vessel 12 at variable temperatures ranging from about ambient to 500° F. or more. The residence time of the effluent gas in the stream within the vessel 12 is likewise variable depending upon gas temperatures and velocities, and he dimensions and flow characteristics of the vessel.

The V.O.C.s in an effluent gas stream are directed in a spiral path downstream to provide maximum turbulence and thus a maximum possibility of contacting the catalytic pads and catalytic heaters. The serpentine, spiral path does not cause substantial backpressure because the clearances 124 and the gaps 126 and 128 ensure that the gas stream is moving at all times. Because the catalytic heaters extend along the sidewalls of the vessel 12 substantially the full length thereof in spanning relationship to the catalytic pads array 36, not only are the pads maintained at an operating temperature, but also those V.O.C.s engaging the sidewalls are largely destroyed. The apparatus 10 thus provides good turbulence, sufficient residence time and contact areas for the V.O.C.s inside the vessel, and a high catalyst temperature to ensure effective destruction of the V.O.C.s introduced therein.

We claim:

1. An apparatus for the removal of volatile organic compounds from gas streams comprising:

an elongated reaction vessel presenting an interior, a gas stream inlet and a gas stream outlet;

a plurality of catalytic pads and means for mounting said pads within said vessel to define a gas stream flow path for promoting contact of said gas stream with said pads; and a plurality of gas-fired catalytic heater units disposed within said vessel to direct catalytically-derived infrared radiation toward said pads, including means mounting said heater units adjacent said pads for directing said catalytically-derived infrared radiation against the pads, said gas-fired catalytic heater units being oriented for heating and destruction of a first fraction of said volatile organic compounds, with the position of the gas-fired catalytic heater units and catalytic pads being correlated for cooperatively destroying a substantial proportion of said volatile organic compounds.

2. An apparatus for the removal of volatile organic compounds from gas streams as set forth in claim 1, wherein the interior of said vessel presents a cross-sectional area, each of said pads presenting a frontal area less than the cross-sectional area of the interior to define a clearance between the vessel and the pads.

3. An apparatus for the removal of volatile organic compounds from gas streams as set forth in claim 1, said vessel including means mounting said catalytic heater units to substantially enclose the interior of said vessel.

4. An apparatus for the removal of volatile organic compounds from gas streams as set forth in claim 1, wherein said pads define an axially extending pad array within said vessel and said catalytic heater units extend substantially the full axial length of said array.

5. An apparatus for the removal of volatile organic compounds from gas streams as set forth claim 1, including means mounting said pads in axially spaced, alternating relationship to each other within the interior of said vessel for defining a serpentine gas stream flow path through said vessel.

* * * * *